(12) United States Patent
DeDe et al.

(10) Patent No.: US 8,245,494 B2
(45) Date of Patent: Aug. 21, 2012

(54) GAS TURBINE ENGINE WITH EDUCTOR AND EDUCTOR FLOW DISTRIBUTION SHIELD

(75) Inventors: Brian C. DeDe, San Diego, CA (US); David Lau, San Diego, CA (US); Nagamany Thayalakhandan, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 862 days.

(21) Appl. No.: 12/370,010

(22) Filed: Feb. 12, 2009

(65) Prior Publication Data

US 2010/0199673 A1 Aug. 12, 2010

(51) Int. Cl.
*F02C 7/12* (2006.01)

(52) U.S. Cl. ...................................... 60/39.83

(58) Field of Classification Search .......... 60/39.08, 60/39.83, 226.1, 770, 771, 782; 244/57–58, 244/117 A; 181/213, 218, 220, 264, 282
See application file for complete search history.

(56) References Cited

U.S. PATENT DOCUMENTS

| | | | | |
|---|---|---|---|---|
| 4,128,769 A * | 12/1978 | Bons et al. | ...................... | 290/52 |
| 5,265,408 A * | 11/1993 | Sheoran et al. | .................. | 60/782 |
| 5,655,359 A * | 8/1997 | Campbell et al. | ............... | 60/772 |
| 6,092,360 A * | 7/2000 | Hoag et al. | ...................... | 60/783 |
| 6,615,576 B2 * | 9/2003 | Sheoran et al. | ................. | 60/39.5 |
| 6,651,929 B2 * | 11/2003 | Dionne | ........................... | 244/57 |
| 7,337,605 B2 * | 3/2008 | Hagshenas | ................... | 60/39.08 |
| 7,698,896 B2 * | 4/2010 | Sheoran et al. | .................. | 60/770 |
| 7,861,512 B2 * | 1/2011 | Olver et al. | .................. | 60/226.1 |
| 7,966,825 B2 * | 6/2011 | Judd | ............................... | 60/770 |
| 2006/0059891 A1 * | 3/2006 | Sheoran et al. | ................. | 60/269 |
| 2007/0214767 A1 * | 9/2007 | Napier et al. | ................ | 60/226.1 |

* cited by examiner

*Primary Examiner* — Phutthiwat Wongwian
(74) *Attorney, Agent, or Firm* — Stephen G. Mican

(57) ABSTRACT

A gas turbine engine comprises: a combustor with an aft end exhaust nozzle that discharges along an axis of the combustor; an eductor with a housing that circumscribes the combustor that has a sideward eductor inlet that intakes generally normal to the combustor axis and an aft end eductor outlet that circumscribes the combustor exhaust nozzle and exhausts along the combustor axis; and an eductor distribution shield mounted within the eductor housing between the eductor inlet and the combustor with a deflection surface that deflects the intake of the eductor inlet around the combustor.

21 Claims, 4 Drawing Sheets

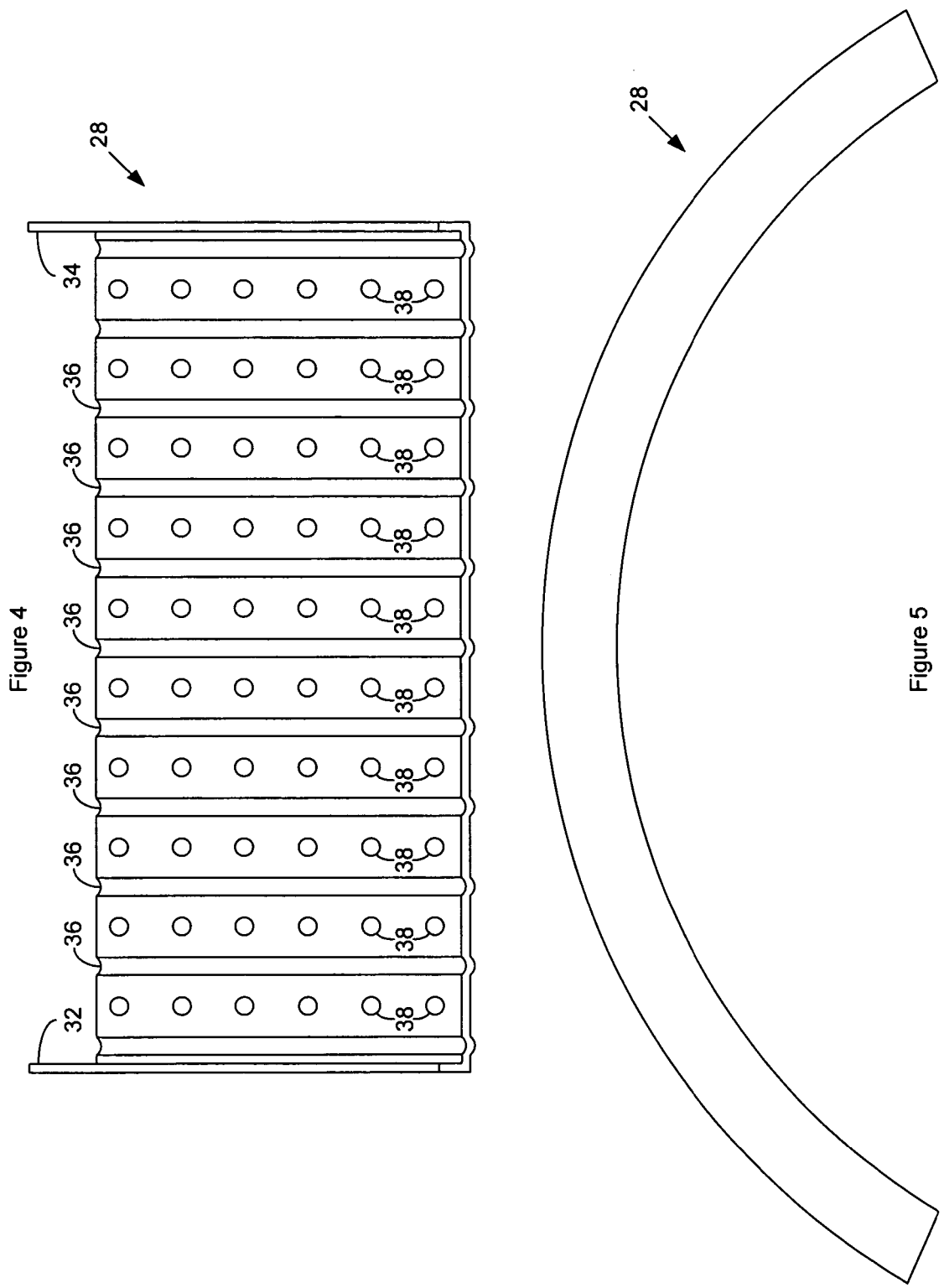

ically top dead centre over the combustor housing, any leakage of engine oil from an engine oil heat exchanger placed over it may drip onto the combustor housing, thereby creating a possible fire hazard.

GAS TURBINE ENGINE WITH EDUCTOR AND EDUCTOR FLOW DISTRIBUTION SHIELD

FIELD OF THE INVENTION

The invention relates to a gas turbine engines, and more particularly to a gas turbine engine with an integral exhaust flow eductor.

BACKGROUND OF THE INVENTION

Gas turbine engines find applications in confined environments with relatively low circulation of ambient air, such as gas turbine engines that serve as auxiliary power units (APUs) in the tail sections of aircraft. Such gas turbine engines often have an integral eductor coupled to the exhaust of the gas turbine engine to induce rapid air flow for cooling purposes, drawing ambient air either from within or without their confines by means of suitable ductwork.

The housing for the eductor circumscribes at least a portion of the combustor section of the engine, thereby cooling the combustor housing. It is common to mount an air-cooled heat exchanger over the inlet for the eductor that circulates and cools engine lubrication oil.

For best air flow, it is important that the eductor induces relatively uniform air flow around its entire perimeter. Unfortunately, due to the sideward mounting of the eductor inlet coupled with the central mounting of the combustor housing, air flow tends to dominate along the length of the eductor proximate its inlet. Furthermore, since for reasons of convenience the positioning of the eductor inlet is also approximately top dead centre over the combustor housing, any leakage of engine oil from an engine oil heat exchanger placed over it may drip onto the combustor housing, thereby creating a possible fire hazard.

SUMMARY OF THE INVENTION

The invention generally comprises a gas turbine engine, comprising: a combustor with an aft end exhaust nozzle that discharges along an axis of the combustor; an eductor with a housing that circumscribes the combustor that has a sideward eductor inlet that intakes generally normal to the combustor axis and an aft end eductor outlet that circumscribes the combustor exhaust nozzle and exhausts along the combustor axis; and an eductor distribution shield mounted within the eductor housing between the eductor inlet and the combustor with a deflection surface that deflects the intake of the eductor inlet around the combustor.

DESCRIPTION OF THE DRAWINGS

FIG. 4 is a side view of an eductor distribution shield according to a possible embodiment of the invention.

FIG. 5 is an aft end view of an eductor distribution shield according to a possible embodiment of the invention.

DETAILED DESCRIPTION OF THE INVENTION

Figure 1:
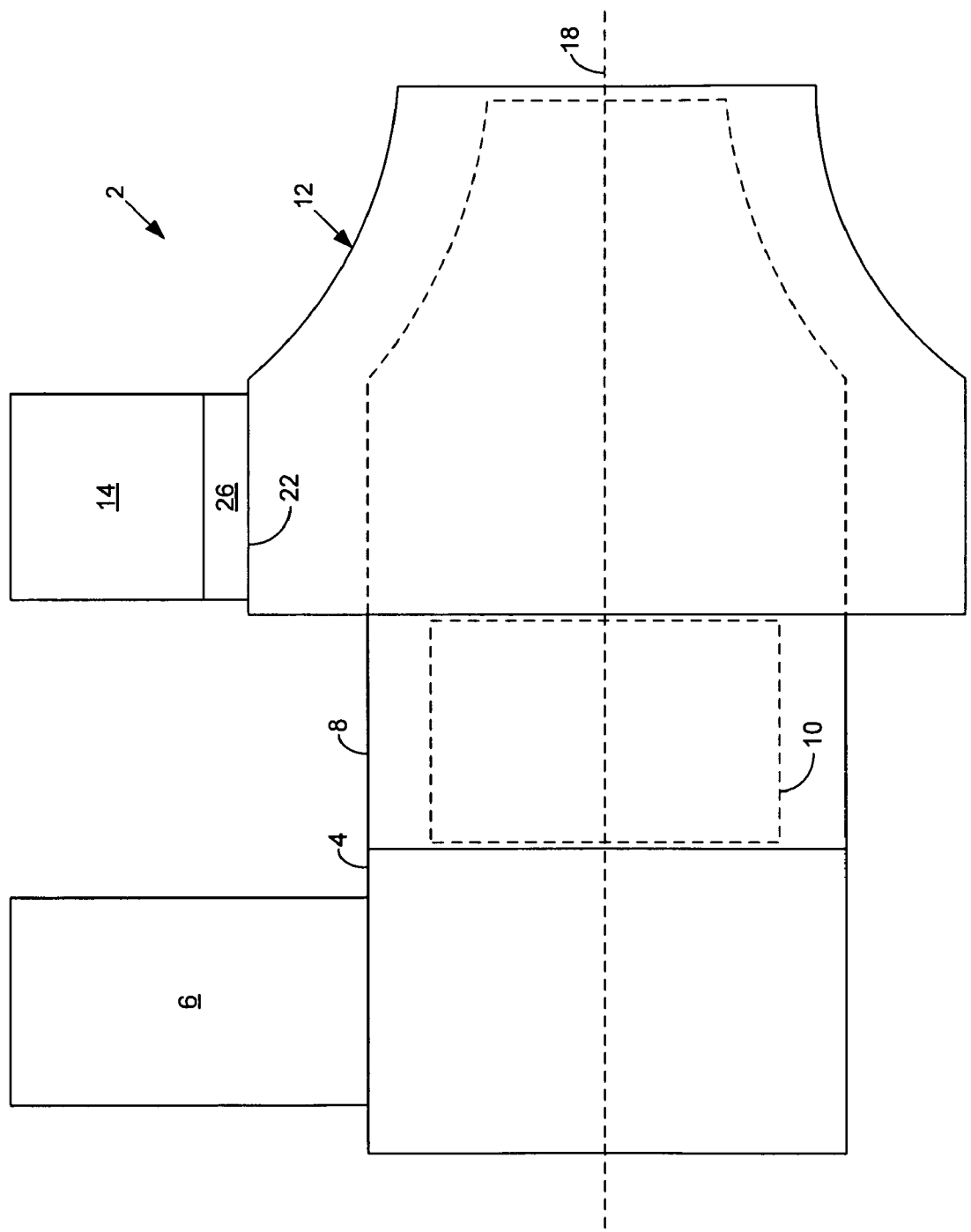
FIG. 1 is a general block diagram of a gas turbine engine that is configurable for a possible embodiment of the invention.

FIG. 1 is a general block diagram of a gas turbine engine 2 that is configurable for a possible embodiment of the invention. The engine 2 comprises an engine air compressor 4 that receives intake air by way of an engine inlet duct 6 and compresses it, a combustor 8 for combining the compressed air from the compressor 4 with fuel and igniting the resulting fuel-air mixture to form combustion gas, and a turbine 10 that receives the combustion gas to generate power and drive the compressor 4.

When the positioning of the engine 2 is in a confined environment with relatively low circulation of ambient air, such as when the engine 2 serves as an APU in the tail section of an aircraft, it is desirable for the engine 2 to have an integral exhaust eductor 12 that receives and accelerates air flow by way of an eductor inlet duct 14.

Figure 2:
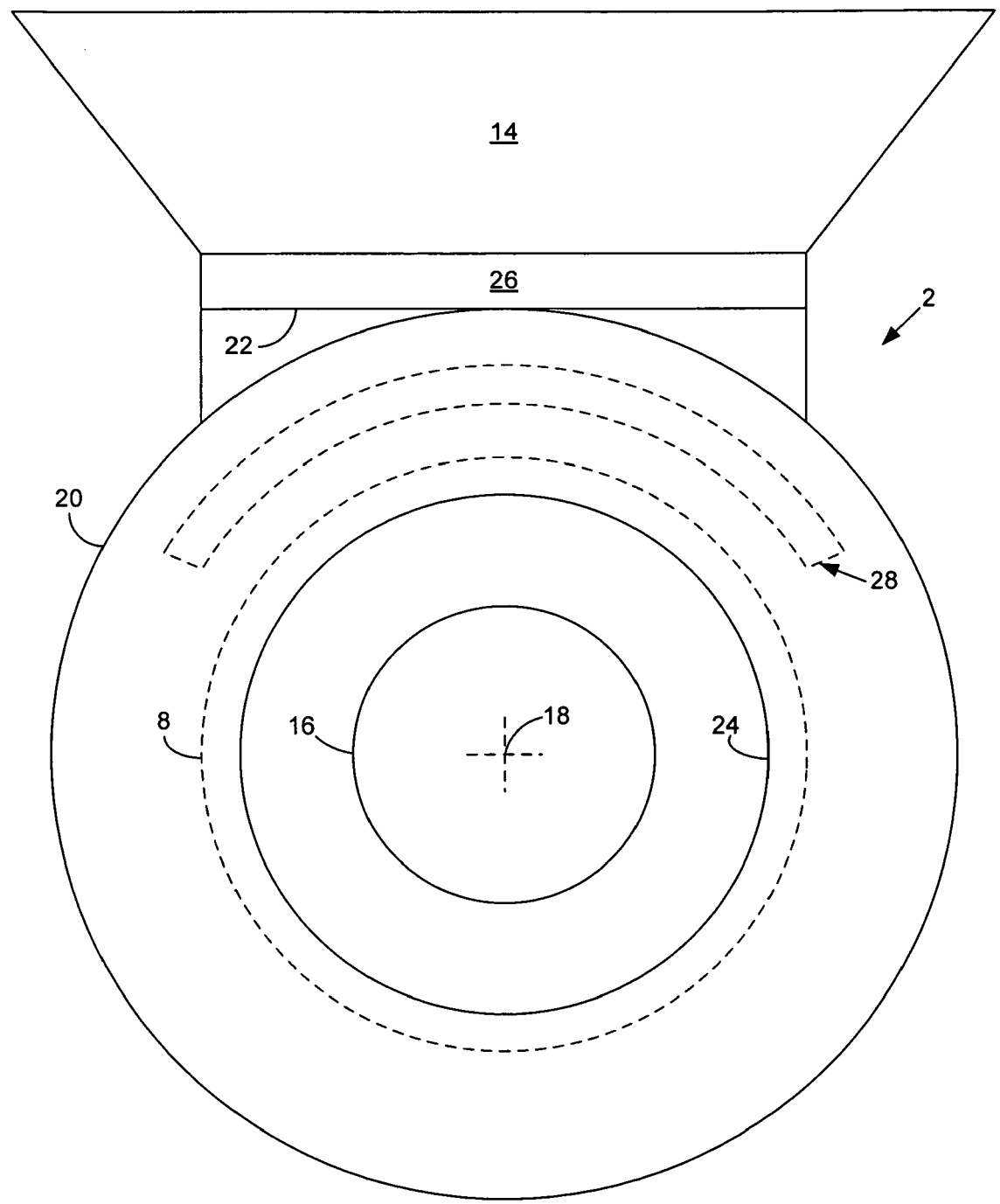
FIG. 2 is an aft end view of a gas turbine engine with an integral eductor according to a possible embodiment of the invention.
Figure 3:
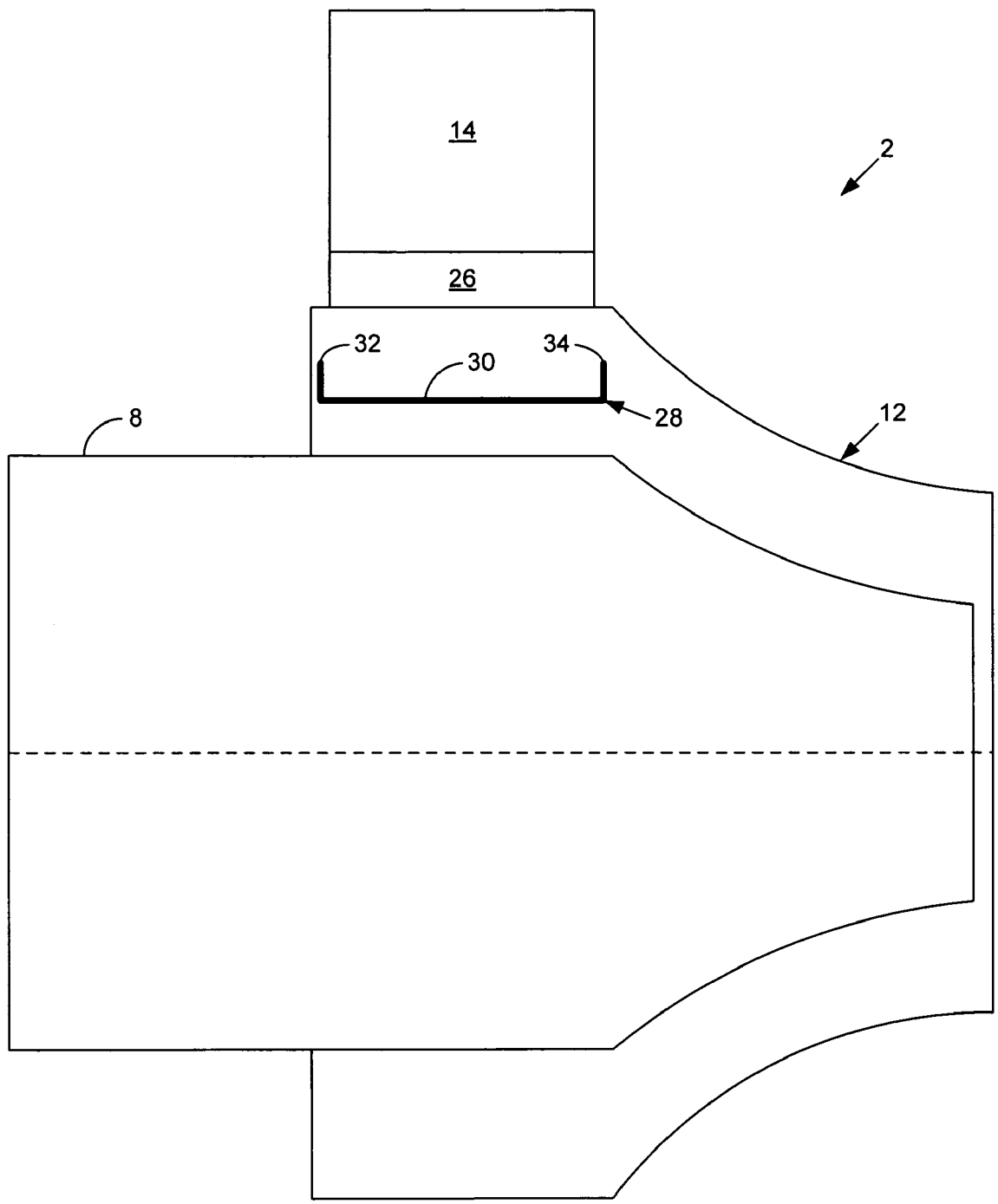
FIG. 3 is a cut-away side view of a gas turbine engine with an integral eductor according to a possible embodiment of the invention.

FIG. 2 is an aft end view and FIG. 3 is a cut-away side view of the engine 2 with the integral eductor 12 according to a possible embodiment of the invention. Referring to FIGS. 1 through 3 together, the combustor 8 has an axially extending aft end exhaust nozzle 16 that discharges combustion gas along an axis 18 of the combustor 8. The eductor 12 has an axially extending housing 20 that circumscribes the axially extending aft end exhaust nozzle 16 of the combustor 8 to define an axially extending annular flow path there between. It has a sideward eductor inlet 22 that intakes air generally normal to the combustor axis 18 and an aft end eductor outlet 24 that circumscribes the combustor exhaust nozzle 16 and exhausts the air along the combustor axis 18.

The eductor inlet 22 may have an air-cooled heat exchanger 26 for fluid mounted over the eductor inlet 22 that cools fluid flowing through the heat exchanger 26. In this case, the eductor inlet duct 14 directs air flow to the eductor inlet 22 through the heat exchanger 26. Generally, the fluid that the heat exchanger 26 circulates is engine lubrication oil for the engine 2.

The engine 2 also has an eductor distribution shield 28 mounted in the axially extending annular flow path within the eductor housing 20 between the eductor inlet 22 and the combustor 8 with a deflection surface 30 that deflects the intake air from the eductor inlet 22 around the combustor 8 and discharges the air at the eductor outlet 24. FIG. 4 is a side view and FIG. 5 is an aft end view of the eductor distribution shield 28 according to a possible embodiment of the invention. Referring to FIGS. 2 through 5 together, the eductor distribution shield 28 is generally crescent-shaped, it has a depth along the combustor axis 18 that is at least as long as the eductor inlet, and it has a width normal to the combustor axis 18 that is greater than the combustor 8.

The shape and size of the eductor distribution shield 28 tends to direct more air from the eductor inlet 22 around the perimeter of the eductor housing 20 and the combustor 8, thereby improving air flow. The eductor distribution shield 28 may also have a fore end lip 32 and an aft end lip 34 to direct fluid that escapes from the heat exchanger 26 away from the combustor 8. The eductor distribution shield 28 may also have multiple channels 36 extending across its deflection surface 30 that extend generally tangential to the combustor axis to direct fluid that escapes from the heat exchanger away from the combustor. The eductor distribution shield 28 may also have multiple perforations or apertures 38 that perforate its deflection surface 30. The size, number and arrangement of these apertures 38 may "fine-tune" the uniform distribution of air flow around the perimeter of the eductor housing 20 and the combustor 8 to maximise air flow through the eductor 12 and thereby optimise its performance.

The described embodiments of the invention are only some illustrative implementations of the invention wherein changes and substitutions of the various parts and arrangement thereof are within the scope of the invention as set forth in the attached claims.

The invention claimed is:

1. A gas turbine engine, comprising:
   an inlet duct that receives an intake air;
   a combustor having an axially extending aft end exhaust nozzle, the combustor receives the intake air and discharges combustion gas along an axis of the combustor;
   an eductor having an axially extending housing that circumscribes the axially extending aft end exhaust nozzle to define an axially extending annular flow path there between, a sideward eductor inlet that intakes generally normal to the combustor axis and an aft end eductor outlet that exhausts an air flow from the sideward eductor inlet; and
   an eductor distribution shield mounted in the axially extending annular flow path between the eductor inlet and the axially extending aft end exhaust nozzle, the eductor distribution shield having a deflection surface in the shape of a ring segment that deflects the air flow from the eductor inlet around the combustor and discharges at the eductor outlet.

2. The engine of claim 1, further comprising an air-cooled heat exchanger for fluid mounted over the eductor inlet that cools fluid flowing through the heat exchanger.

3. The engine of claim 2, wherein the eductor distribution shield comprises lips on its fore and aft ends relative to the combustor axis to direct fluid that escapes from the heat exchanger away from the combustor.

4. The engine of claim 2, wherein the eductor distribution shield comprises multiple channels that extend across its deflection surface that extend generally tangential to the combustor axis to direct fluid that escapes from the heat exchanger away from the combustor.

5. The engine of claim 2, wherein a depth of the eductor distribution shield along the combustor axis is at least as long as the eductor inlet.

6. The engine of claim 2, further comprising an inlet duct coupled to the heat exchanger to direct inlet air through the heat exchanger into the eductor inlet.

7. The engine of claim 1, wherein a width of the eductor distribution shield is greater than a width of the combustor.

8. The engine of claim 1, wherein the eductor distribution shield comprises multiple apertures that penetrate its deflection surface to improve the uniform distribution of air flow through the eductor.

9. An eductor for a gas turbine engine having an inlet duct that receives an intake air, a combustor with an axially extending aft end exhaust nozzle that discharges combustion gas along an axis of the combustor, comprising:
   an axially extending housing that circumscribes the axially extending aft end exhaust nozzle to define an axially extending annular flow path there between;
   a sideward eductor inlet that intakes an air flow generally normal to the combustor axis;
   an aft end eductor outlet that circumscribes the axially extending exhaust nozzle and exhausts the air flow along the combustor axis; and
   an eductor distribution shield disposed in the axially extending annular flow path, the eductor distribution shield having a deflection surface in the shape of a ring segment that deflects the intake of the eductor inlet around the combustor and discharges at the eductor outlet.

10. The eductor of claim 9, wherein the sideward eductor inlet receives an air-cooled heat exchanger.

11. The eductor of claim 10, wherein the eductor distribution shield has lips on its fore and aft ends relative to the combustor axis to direct fluid that escapes from the heat exchanger away from the combustor.

12. The eductor of claim 10, wherein the eductor distribution shield has multiple channels that extend across its deflection surface that extend generally tangential to the combustor axis to direct fluid that escapes from the heat exchanger away from the combustor.

13. The eductor of claim 10, wherein a depth of the eductor distribution shield along the combustor axis is at least as long as the eductor inlet.

14. The eductor of claim 9, wherein a width of the eductor distribution shield is greater than a width of the combustor.

15. The eductor of claim 9, wherein the eductor distribution shield comprises multiple apertures that penetrate its deflection surface to improve the uniform distribution of air flow through the eductor.

16. An eductor distribution shield for a gas turbine engine eductor with an axially extending housing that circumscribes an engine combustor to define an axially extending annular flow path there between, the engine combustor receives an intake air from a gas turbine intake, the combustor having an axially extending aft end exhaust nozzle that discharges exhaust of the gas turbine engine along an axis of the combustor, the gas turbine engine eductor having a sideward eductor inlet that intakes an air flow generally normal to the combustor axis and an aft end eductor outlet that circumscribes the axially extending aft end exhaust nozzle and exhausts the air flow along the combustor axis, the eductor distribution shield comprising:
   deflection surface in the shape of a ring segment disposed in the axially extending annular flow path that deflects the air flow from the eductor inlet around the combustor.

17. The eductor distribution shield of claim 16, wherein the eductor distribution shield further comprises lips on its fore and aft ends relative to the combustor axis to direct fluid that escapes from an air-cooled heat exchanger mounted over the eductor inlet away from the combustor.

18. The eductor distribution shield of claim 16, wherein the eductor distribution shield further comprises multiple channels that extend across its deflection surface proximate the eductor inlet that extend generally tangential to the combustor axis to direct fluid that escapes from an air-cooled heat exchanger mounted over the eductor inlet away from the combustor.

19. The eductor distribution shield of claim 16, wherein a depth of the eductor distribution shield along the combustor axis is at least as long as the eductor inlet.

20. The eductor distribution shield of claim 16, wherein a width of the eductor distribution shield is greater than a width of the combustor.

21. The eductor distribution shield of claim 16, wherein the eductor distribution shield further comprises multiple apertures that penetrate its deflection surface to improve the uniform distribution of air flow through the eductor.

* * * * *